Patented Feb. 26, 1952

2,587,262

UNITED STATES PATENT OFFICE 2,587,262

PROCESS FOR PREPARING PYRIDINE ANALOG OF THIAMIN

Andrew N. Wilson, Colonia, and Stanton A. Harris, Westfield, N. J., assignors to Merck & Co., Inc., Rahway, N. J., a corporation of New Jersey No Drawing. Application August 28, 1948, Serial No. 46,708

8 Claims. (Cl. 260—256.4)

This invention relates to the preparation of new chemical compounds, 1[(4-amino-2-methyl) - 5 - pyrimidylmethyl] - 2 - methyl - 3 - (β - hydroxyethyl)-pyridinium acid salts, more particularly the bromide hydrobromide, chloride hydrochloride and dipicrate salts.

The new chemical compounds with which our invention is concerned, 1-[(4-amino-2-methyl)-5 - pyrimidylmethyl] - 2 - methyl - 3 - (β - hydroxyethyl)-pyridinium acid salts, possess marked and effective antivitamin action. They may be utilized in counteracting the effect of thiamin. In certain diseases the creation of a thiamin deficiency has a retarding effect on the course of the disease. Investigators such as Kearney, E. D., et al., Journal of Infectious Diseases 82, 177–186 (1948); Rassmussen, A. S., et al., Journal of Infectious Diseases 74, 41–47 (1944), and Foster, C., et al., Journal of Experimental Medicine 79, 221–234 (1944) have found that by decreasing the amount of thiamin in the diet the susceptibility to diseases such as western equine encephalomyelitis and poliomyelitis is decreased.

The synthesis of a compound reported to be 1 - [(4 - amino - 2 - methyl) - 5 - pyrimidylmethyl] - 2 - methyl - 3 - (β - hydroxyethyl) - pyridinium bromide hydrobromide was described by Tracy and Elderfield, Journal of Organic Chemistry, 6, 54 (1941). Other investigators, such as Schmelkes, Science, 90 113 (1939); Schmelkes and Joiner, Journal of the American Chemical Society, 61, 2562 (1939); and Baumgarten and Dornow, Berichte, 73, 44, 353 (1940), have attempted to prepare a compound having the structure of 1-[(4-amino-2-methyl)-5-pyrimidylmethyl] - 2 - methyl - 3 - (β - hydroxyethyl)-pyridinium bromide hydrobromide. In every case, the products were later discovered to have an isomeric structure.

The Tracy and Elderfield process involves heating a suspension of 2 - methyl - 4 - amino - 5-bromomethylpyridinium hydrobromide and 2-methyl-3-(β-hydroxyethyl)pyridine in petrolatum at 100° for 1 hour. We have discovered that Tracy and Eldergeld did not succeed in producing 1 - [(4-amino-2-methyl) -5-pyrimidylmethyl] - 2 - methyl - 3 - (β - hydroxyethyl) - pyridinium bromide hydrobromide and we have been unable to produce this compound by the process described in their publication.

We have produced a substance by the Tracy and Elderfield method, which has the properties correpsonding to those described by them. However, we have discovered that this product does not have the chemical structure as represented by formula I below. The analyses of their product to do agree with the theoretical analyses for 1 - [(4 - amino - 2 - methyl - 5 - pyrimidylmethyl] - 2 - methyl - 3 - (β-hydroxyethyl) - pyridinium bromide hydrobromide. Also the infrared and ultraviolet absorption spectra, the titration curve and the solubility of the Tracy and Elderfield product do not agree with the expected properties of 1-[(4-amino-2-methyl)-5-pyrimidylmethyl] - 2 - methyl - 3 - (β-hydroxyethyl)-pyridinium bromide hydrobromide. The chemical structure of the Tracy and Elderfield product is still unknown and since the analyses are not constant, it probably is not a single compound. Analyses, absorption spectra and titration data indicate that the Tracy and Elderfield product is a polymeric compound containing an excess number of pyrimidine moieties. It seems to have ratios of pyrimidine to pyridine in mixtures of 2 to 1, 3 to 1, 4 to 1, etc. The typical pyridine type structure does not show up either by infrared or ultraviolet absorption. However, the pyridine moiety can be recovered from this substance by degradation with sodium bisulfite solution.

We have discovered that 1-[(4-amino-2-methyl) - 5 - pyrimidylmethyl] - 2 - methyl - 3 - (β-hydroxyethyl)-pyridinium bromide hydrobromide can be prepared by procedures which are quite different than those employed by Tracy and Elderfield to produce their product. In preparing our novel chemical compounds, we utilize as the starting materials, 2-methyl-5-bromomethyl - 6 - aminopyrimidine dihydrobromide, which has the structure formula:

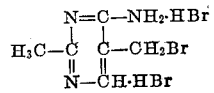

and 2 - methyl - 3 - (β - hydroxyethyl) - pyridine which may be identified by the following formula:

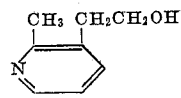

It has been found that 2-methyl-5-bromomethyl-6-amino-pyrimidine dihydrobromide and an excess of 2-methyl-3-(β-hydroxyethyl)-pyridine may be reacted in the presence of a solvent such as acetonitrile, acetone, ethyl alcohol and isopropyl alcohol at temperatures preferably below 27° C. Although the reaction will occur if a small excess of 2-methyl-3-(β-hydroxyethyl)- pyridine is employed, best results are obtained utilizing one part pyrimidine compound to about six parts of the pyridine compound. In the case of acetonitrile, it is desirable to carry out the coupling reaction at about 5° C. This reaction results in 1-[(4-amino-2-methyl)-5-pyrimidylmethyl] - 2 - methyl - 3 - (β - hydroxyethyl)-pyridinium bromide hydrobromide, which has the structural formula:

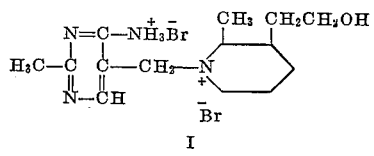

I

An aqueous solution of 1-[(4-amino-2-methyl)-5 - pyrimidylmethyl] - 2 - methyl - 3 - (β - hydroxyethyl)-pyridinium bromide hydrobromide may then be treated with an aqueous solution or an aqueous ethyl alcohol solution of picric acid ($C_6H_3N_3O_7$). The crystalline dipicrate salt of 1-[(4-amino-2-methyl)-5-pyrimidylmethyl]-2-methyl-3-(β-hydroxyethyl)-pyridine which is recovered may be identified by the following formula:

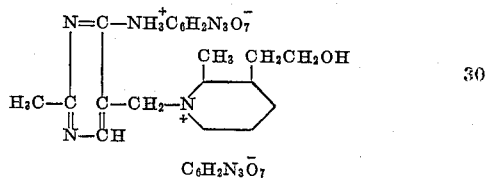

The reaction of the dipicrate salts of 1-[(4-amino - 2 - methyl) - 5 - pyrimidylmethyl] - 2-methyl-3-(β-hydroxyethyl)-pyridine with hydrochloric acid results in the formation of 1-[(4-amino - 2 - methyl - 5 - pyrimidylmethyl) - 2-methyl - 3 - (β - hydroxy - ethyl) - pyridinium chloride hydrochloride which has the following formula:

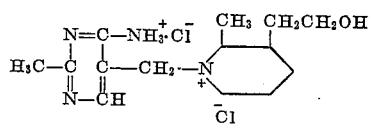

The following examples illustrate methods of carrying out the present invention and include a comparison of physical properties of the Tracy and Elderfield compound and the product produced by the present invention. It is to be understood that these examples are given primarily by way of illustration and not of limitation.

EXAMPLE 1

A solution of 300 milligrams of 2-methyl-3-(β-hydroxyethyl)-pyridine dissolved in 10 milliliters of acetonitrile, was chilled to about 5° C. and 120 milligrams of 2-methyl-5-bromomethyl-6-aminopyrimidine dihydrobromide was added. The mixture was shaken for a few minutes to effect solution. The reaction mixture was then allowed to stand for about 16 hours in the refrigerator at about 0–3° C. whereupon a white crystalline product separated from solution. The mixture was centrifuged and the solid was washed twice with fresh portions of acetonitrile, twice with absolute ether and dried. There was secured 105 milligrams (75% yield based on pyrimidine used) of 1-[(4-amino-2-methyl)-5-pyrimidylmethyl] - 2 - methyl - 3 - (β - hydroxyethyl)-pyridinium bromide hydrobromide.

Comparison of analyses

Calculated for $C_{14}H_{20}N_4OBr_2$: C, 40.02; H, 4.80; N, 13.34

| Sample From Example 1 Above | Tracy and Elderfield Compound |
|---|---|
| Found: C, 40.16 H, 4.78 N, 13.33 | Found: Sample #1 {C, 38.10 H, 4.65 N, 16.20, 16.50} Sample #2 {C, 38.04, 38.14 H, 4.37, 4.59 N, 15.88} Sample #3 {C, 38.53 H, 5.11 N, 14.59, 14.30} |

Comparison of infrared absorption spectra

| Sample From Example 1 Above λ in μ | Tracy and Elderfield Compound λ in μ |
|---|---|
| 14.12 S | |
| 13.80 S | |
| 13.32 W | 13.29 W |
| 12.86 M | |
| 12.39 S | 12.45 W |
| 12.15 VW | |
| 11.84 M | 11.67 M (broad) |
| 11.45 W | |
| 10.55 M | 10.54 S |
| 10.36 VW | |
| 10.11 M | 9.96 M |
| 9.66 M | |
| 9.56 S | 9.57 S |
| 9.06 M | 8.87 VW |
| 8.64 M | 8.61 M |
| 8.22 M | 8.20 S |
| 8.12 W | |
| 7.96 M | |
| 7.76 W | 7.79 M |
| 6.69 S | 7.11 S |
| 6.55 S | 6.51 M |
| 6.47 S | |
| 6.19 S | |
| 5.98 S | 6.04 S |
| 3.05 S | 3.05 M |

Code.—Letters represent the relative absorption intensities of the maxima:
S=Strong
M=Medium
W=Weak
VW=Very Weak Comparison of ultraviolet absorption spectra

| Sample From Example 1 Above λ in mμ | Tracy and Elderfield Compound λ in mμ |
|---|---|
| λ max. 244 and 268 mμ. in buffer solution pH 3.5 | λ max. ca 260 mμ. (broad band) in buffer solution pH 3.5 |
| λ max. 237 and 272 mμ. in water. | λ max. ca 263 mμ. (broad) in water. |

Comparison of decomposition points

| Sample From Example 1 Above | Tracy and Elderfield Compound |
|---|---|
| Decomposition Point 209–210° C. | Chars at about 240–260° C. |

Comparison of solubilities

| Sample From Example 1 Above | Tracy and Elderfield Compound |
|---|---|
| Soluble in water and methyl alcohol. Insoluble in ethyl alcohol. | Soluble in water, methyl alcohol and ethyl alcohol. |

EXAMPLE 2

To a solution of 600 milligrams of 2-methyl-3-(β-hydroxyethyl)-pyridine dissolved in 3 to 4 milliliters of isopropyl alcohol was added 240 milligrams of 2-methyl-5-bromomethyl-6-aminopyrimidine dihydrobromide. The reaction mixture was shaken until solution was effected. The mixture was allowed to stand for about 16 hours at room temperature whereupon a crystalline product separated from solution. The product was centrifuged, washed with fresh isopropyl alcohol, with petroleum ether, and dried. There was secured 200 mg. (73% yield based on pyrimidine) of 1-[(4-amino-2-methyl)-5-pyrimidylmethyl]-2-methyl-3-(β-hydroxyethyl)-pyridinium bromide hydrobromide. This product had a decomposition point of about 205° C. and a maximum wavelength in water of 238 and 270 mμ.

The reaction of proportions of 150 milligrams of 2-methyl-3-(β-hydroxyethyl)-pyridine and 120 milligrams of 2-methyl-5-bromomethyl-6-aminopyrimidine dihydrobromide in an isopropyl alcohol medium resulted in 20 milligrams of 1-[(4-amino-2-methyl)-5-pyrimidylmethyl]-2-methyl-2-methyl-3-(β-hydroxyethyl)-pyridinium bromide hydrobromide.

EXAMPLE 3

To a solution of 600 milligrams of 2-methyl-3-(β-hydroxyethyl)-pyridine dissolved in 10 milliliters of acetone was added 240 milligrams of 2-methyl-5-bromomethyl-6-aminopyrimidine dihydrobromide. The mixture was shaken until most of the pyrimidine had dissolved and in a few minutes a gummy precipitate had formed. The supernatant liquor was decanted from the gum and was allowed to stand for about 16 hours at room temperature. The product separated from solution as a solid. The mixture was then centrifuged, washed with fresh portions of acetone, with petroleum ether, and dried. There was secured 150 milligrams (55% based on pyrimidine) of 1-[(4-amino-2-methyl)-5-pyrimidylmethyl]-2-methyl-3-(β-hydroxyethyl)-pyridinium bromide hydrobromide having a decomposition point of 218–220° C. and a maximum wavelength in water of 237 and 271 mμ. The high decomposition point apparently indicated the presence of impurities.

EXAMPLE 4

A solution of 84 milligrams of 1-[(4-amino-2-methyl)-5-pyrimidylmethyl]-2-methyl-3-(β-hydroxyethyl)-pyridinium bromide hydrobromide in 50 milliliters of water was added to a solution of 120 milligrams of picric acid in 75 milliliters of water. Some gummy precipitate formed immediately. The solution was filtered from the gum and was allowed to stand for 16 hours in the refrigerator where the product separated in a crystalline condition. The product was filtered, washed with water and dried. There was secured 50 milligrams (35% yield) of the dipicrate salt of 1-[(4-amino-2-methyl)-5-pyrimidylmethyl]-2-methyl-3-(β-hydroxyethyl)-pyridine having a melting point of 181–182° C.

Analysis calculated for $C_{26}H_{24}N_{10}O_{15}$:
C, 43.58; H, 3.38; N, 19.55.
Found: C, 43.68; H. 3.49; N, 19.42.

EXAMPLE 5

A solution of 250 milligrams of 1-[(4-amino-2-methyl)-5-pyrimidylmethyl]-2-methyl-3-(β-hydroxyethyl)-pyridinium bromide hydrobromide dissolved in 10 milliliters of water was added slowly to a solution of 500 milligrams of picric acid in 20 milliliters of ethanol and 10 milliliters of water. On standing for about 16 hours in the refrigerator the product separated as a solid. There was secured 350 milligrams (82% yield) of the dipicrate of 1-[(4-amino-2-methyl)-5-pyrimidylmethyl]-2-methyl-3-(β-hydroxyethyl)-pyridine having a melting point of 180–181° C.

EXAMPLE 6

Eight-hundred and forty milligrams of 1-[(4-amino-2-methyl)-5-pyrimidylmethyl]-2-methyl-3-(β-hydroxyethyl)-pyridinium bromide hydrobromide was converted to the dipicrate as described above (Example 6). The melting point of a dried aliquot was 183–184° C. The main crop was suspended in water, was acidified with dilute hydrochloric acid, and the liberated picric acid was extracted with nitrobenzene. The aqueous solution was extracted further with ether, then concentrated to a small volume under reduced pressure. Upon addition of isopropyl alcohol to the residue, the product crystallized slowly. It was filtered, washed with isopropyl alcohol, with ether, and dried. There was secured 260 milligrams (40% yield of 1-[(4-amino-2-methyl)-5-pyrimidylmethyl]-2-methyl-3-(β-hydroxyethyl)-pyridinium chloride hydrochloride having a decomposition point of 234–236° C. and a maximum wavelength in water of 237 and 271 mμ.

Analysis calculated for $C_{14}H_{20}N_4OCl_2$:
C, 50.76; H, 6.09; N, 16.92;
Found: C, 50.69; H, 6.08; N, 16.76.

*Comparison of electrometric titrations*

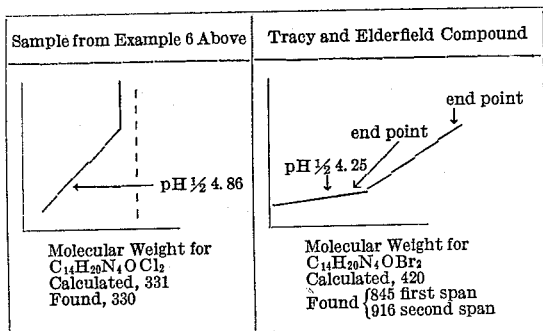

| Sample from Example 6 Above | Tracy and Elderfield Compound |
|---|---|
| pH ½ 4.86 | pH ½ 4.25 end point |
| Molecular Weight for $C_{14}H_{20}N_4OCl_2$ Calculated, 331 Found, 330 | Molecular Weight for $C_{14}H_{20}N_4OBr_2$ Calculated, 420 Found {845 first span, 916 second span} |

The above description and examples are intended to be illustrative only, any modification of, or variation therefrom which conforms to the spirit of the invention, is intended to be included within the scope of the claims.

We claim:
1. The process that comprises reacting 2-methyl-3-(β-hydroxyethyl)-pyridine and 2-methyl-5-bromomethyl-6-aminopyrimidine dihydrobromide in the presence of a solvent selected from the class consisting of acetonitrile, acetone, and a lower aliphatic alcohol at a temperature of between 0° and 27° C., recovering 1-[(4-amino-2-methyl)-5-pyrimidylmethyl]-2-methyl-3-(β-hydroxyethyl)-pyridinium bromide hydrobromide thus formed, reacting the latter compound with picric acid, recovering the dipicrate of 1-[(4-amino-2-methyl)-5-pyrimidylmethyl]-2-methyl-3-(β-hydroxyethyl)-pyridine thus formed, reacting the latter compound with hydrochloric acid and recovering 1-[(4-amino-2-methyl)-5-pyrimidylmethyl]-2-methyl-3-(β-hydroxyethyl)-pyridinium chloride hydrochloride.

2. The process that comprises reacting 2-methyl-3-(β-hydroxyethyl)-pyridine and 2-methyl-5-bromomethyl-6-aminopyrimidine dihydrobromide in the presence of a solvent selected from the class consisting of acetonitrile, acetone, and a lower aliphatic alcohol at a temperature of between 0° and 27° C., and recovering 1-[(4-amino-2-methyl) - 5 - pyrimidylmethyl]-2-methyl-3-(β-hydroxyethyl)-pyridinium bromide hydrobromide thus formed.

3. The process that comprises reacting 2-methyl - 3 - (β - hydroxyethyl) - pyridine and 2-methyl-5-bromomethyl-6-aminopyrimidine dihydrobromide in the presence of acetonitrile at a temperature of between 0 to 5° C. and recovering 1-[(4 - amino-2-methyl)-5-pyrimidylmethyl]-2-methyl-3-(β-hydroxyethyl)-pyridinium bromide hydrobromide.

4. The process that comprises reacting 2-methyl-3-(β-hydroxyethyl)-pyridine and 2-methyl-5-bromomethyl - 6 - aminopyrimidine dihydrobromide in the presence of isopropyl alcohol at room temperature and recovering 1 - [(4 - amino-2-methyl) - 5-pyrimidylmethyl]-2-methyl-3-(β-hydroxyethyl)-pyridinium bromide hydrobromide.

5. The process that comprises reacting 2-methyl-3-(β-hydroxyethyl)-pyridine and 2-methyl-5-bromomethyl - 6 - aminopyrimidine dihydrobromide in the presence of acetone at room temperature and recovering 1-[(4-amino-2-methyl)-5 - pyrimidylmethyl]-2-methyl - 3 - (β - hydroxyethyl)-pyridinium bromide hydrobromide.

6. The process that comprises reacting 1-[(4-amino-2-methyl)-5-pyrimidylmethyl]- 2 - methyl-3-(β-hydroxyethyl)-pyridinium bromide hydrobromide and picric acid in an aqueous medium and recovering the dipicrate of 1-[(4-amino-2-methyl)-5-pyrimidylmethyl]-2-methyl-3-(β - hydroxyethyl)-pyridine.

7. The process that comprises reacting 1-[(4-amino-2-methyl)-5-pyrimidylmethyl]-2-methyl-3-(β-hydroxyethyl)-pyridinium bromide hydrobromide and picric acid in an aqueous alcoholic medium and recovering the dipicrate of 1-[(4-amino-2-methyl)-5-pyrimidylmethyl]-2-methyl-3-(β-hydroxyethyl)-pyridine.

8. The process that comprises reacting the dipicrate of 1-[(4-amino-2-methyl)-5-pyrimidylmethyl]-2-methyl-3-(β-hydroxyethyl) - pyridine with hydrochloric acid and recovering 1-[(4-amino-2-methyl)-5-pyrimidylmethyl]- 2 - methyl-3-(β-hydroxyethyl)-pyridinium chloride hydrochloride.

ANDREW N. WILSON.
STANTON A. HARRIS.

REFERENCES CITED

The following references are of record in the file of this patent:

Dornow, Ber. Deut. Chem., 73, 353 (1940).
Tracy et al., Science 92, 180–181 (1940).
Schmelkes et al., J. Am. Chem. Soc. 61, 2562–2563 (1939).